United States Patent [19]  
Carroll

[11] Patent Number: 4,746,526  
[45] Date of Patent: May 24, 1988

[54] METHOD FOR PREPARING PREBAKED, OVEN READY, CHEMICALLY LEAVENED FROZEN BISCUITS

[75] Inventor: Leo P. Carroll, Louisville, Ky.

[73] Assignee: Liqui-Dri Foods, Inc., Louisville, Ky.

[21] Appl. No.: 55,358

[22] Filed: May 29, 1987

[51] Int. Cl.$^4$ .................. A21D 13/00; A21D 15/00
[52] U.S. Cl. .................................. 426/496; 426/551; 426/497
[58] Field of Search ............... 426/496, 497, 498, 506, 426/551, 524, 561, 562, 563

[56] References Cited

U.S. PATENT DOCUMENTS

| | | |
|---|---|---|
| 3,052,549 | 9/1962 | Kichline et al. ............... 426/551 |
| 3,061,441 | 10/1962 | Halbach ........................ 426/551 |
| 3,212,903 | 10/1965 | Oberholtzer ................... 426/551 |
| 3,821,441 | 6/1974 | Tomita et al. ................. 426/551 |
| 4,303,687 | 12/1981 | Ratjen .......................... 426/497 |

Primary Examiner—Joseph Golian
Assistant Examiner—Helen Pratt
Attorney, Agent, or Firm—Joseph P. O'Halloran

[57] ABSTRACT

A method for manufacture of a pre-baked, chemically leavened frozen biscuit is disclosed. A conventional, chemically leavened biscuit dough is prepared, cut into biscuit pre-forms, and is fully baked. This baked intermediate product is then tempered or moisture-treated to raise the upper crust moisture content to above 16%, by weight, preferably above 20%. This can be done in any manner, such as for example, by contacting the crust with an atomized spray of water for the necessary period of time (e.g. for a few seconds), or by allowing the freshly baked biscuits to be maintained in a proofing cabinet for 15 to 20 minutes at temperatures of 140°–150° F. at 70% to 90% relative humidity. The thus tempered product is then frozen, and without an intervening defrost step, is then capable of being placed directly in an oven for "baking" to provide a biscuit similar to fresh baked biscuits when served hot.

8 Claims, No Drawings

4,746,526

METHOD FOR PREPARING PREBAKED, OVEN READY, CHEMICALLY LEAVENED FROZEN BISCUITS

BACKGROUND OF THE INVENTION

1. Field of the Invention

The present invention relates to a process for making oven ready chemically leavened pre-baked frozen biscuits. The final baking of the frozen product, without a defrost step results in a product which is rated as comparable to fresh baked biscuits.

2. Description of the Prior Art

Chemical leavening is normally employed in making biscuits.

I am unaware of any biscuit manufacturing process which results in a frozen biscuit product that can be placed directly into an oven from the freezer, and which, when then served hot, would provide the characteristics normally associated with freshly baked biscuits. Prior attempts that we are aware of either resulted in crusts that were crumbly, dry, crispy and with interiors which were gummy, or products which collapsed at some point during processing, and then didn't rise to an acceptable level upon final reheating for the consumer.

The present invention achieves an oven-ready, fully baked, chemically leavened, frozen biscuit that "passes for" a fresh baked biscuit when served hot out of the oven. Moreover, if a frozen biscuit had to be thawed out before final baking, it would not be acceptable for use in many restaurants and could be relatively inconvenient for home use, as well. An object of this invention is to provide a frozen biscuit that can be placed directly into a hot oven for heating for consumption.

Since fresh-baked biscuits enjoy almost universal acceptance, and since the product of this invention is so easily prepared by the consumer, with no fuss or mess, the process and product of this invention will satisfy an important need in restaurants, fast-food outlets, and in homes as well.

SUMMARY OF THE INVENTION

The process for making chemically leavened fully baked oven ready frozen biscuits in accordance with the present invention comprises the following steps:

(a) mixing conventional dough and shaping the dough into biscuits;

(b) baking the shaped biscuits until fully baked e.g. approximately 340° F. for 15 minutes;

(c) moisture-treating the baked biscuit by raising the moisture content of the upper crust to above 16% by weight, preferably above 20%, and most preferably to above 25%, to produce a "tempered" biscuit. This can be done, for example, by spraying or contacting the freshly fully baked biscuit with an atomized spray of water, or by maintaining the biscuits in a proofing environment having temperature in the range 130°-160° F. at relative humidities of 60-95% for 15-20 minutes;

(d) freezing the resulting tempered biscuits, for example, by placing them in an environment of 0° F. or lower for a sufficient period of time to drop the product temperature to 0° F. or lower;

(e) taking the biscuits from the freezer and directly placing them in an oven and subjecting the biscuits to what would otherwise be a normal "baking" step for freshly prepared biscuits, for example, at 325° F. for about 15 minutes.

The tempered biscuit can be frozen solid by being placed into any conventional industrial freezing environment, for example. The process of this invention is well suited to incorporation into mass production manufacturing and distribution systems.

DETAILED DESCRIPTION OF THE INVENTION

Any conventional biscuit dough formula can be used in the method of the present invention. The following formula is exemplary:

| Ingredient | Percent |
| --- | --- |
| Soft Wheat Flour | 47.00 |
| Plastic Shortening (e.g. Durkee "Cakemix 96" TM | 11.34 |
| Sugar | 1.26 |
| Salt | 1.26 |
| Soda (Sodium Bicarbonate) | 1.07 |
| Sodium Aluminum Phosphate | 1.07 |
| Fresh Buttermilk | 37.00 |
| | 100% |

As indicated, the above formulation is exemplary, and any conventional formula can be used in accordance with the method of the present invention.

The resulting dough is quickly sheeted into a sheet having a thickness of about ¾", and is cut into the desired shape and size.

A plurality of the resulting cut biscuits are normally placed in close, barely touching proximity to each other on a sheet for oven baking.

The resulting cut biscuits are baked under any conventional baking conditions in which they are substantially "baked out" i.e. fully baked, for example, at temperatures of about 325°-375° F. for 10-15 minutes, as necessary. The baking temperatures and times can be varied by one with ordinary skill in the art depending on local conditions, and upon the configuration of the biscuits, to provide a baked interior. An entirely satisfactory exemplary internal temperature to which the interiors of the biscuits are raised in order to be "fully baked" is 170° F., or to a temperature above 165° F., generally speaking, for example, and a time sufficient to eliminate a doughy interior.

As used herein, "upper crust" refers to the upper substantially horizontal surface of the biscuit i.e. it is just the horizontal crust at the crown, with the adhering crumb that is normally attached thereto having been scraped away. In fact, however, other portions of the crown may be regarded as exposed crust. These usually slanting portions of the crust, slanting between the upper crust and the substantially vertical sides of the biscuit, will also automatically benefit from the processing in accordance with this invention.

In order to determine whether the moisture levels called for in the claims are being met, only the upper crust as defined herebefore need be tested for moisture.

It is noted that the leavening system in the formula set forth above is a classic, traditional and conventional chemical leavening system, and, generally speaking, it is desirable to initiate the baking of the dough as quickly as possible once the dry, chemical leavening ingredients are mixed with the aqueous ingredients.

In a preferred embodiment, the baked biscuits are placed in a proofing cabinet, for example, having temperatures of 130°-170° F., preferably 140°-150° F., and having a relative humidity of 60-95%, preferably 70-95%, for a period of time of 15 to 20 minutes.

The resulting tempered product is then frozen, for example, by being maintained in an environment at 0° F. or lower, for a sufficient period of time to drop the temperature of the product to −10° F.-0° F.

These products can be individually wrapped or group-wrapped for ultimate use by the consumer. When the product of this invention is to be stored frozen for a substantial period of time, it should be wrapped in a moisture barrier. The wrapping step may occur either before or after the freezing step.

When the consumer wishes to use this pre-baked frozen product, the consumer need only take the product from the freezer, remove it from its container, and place it into a hot oven at the desired baking temperature, and subject it to what would be regarded as relatively gentle baking conditions. For example, baking in an oven at 325° F. for 15 minutes is satisfactory.

EXAMPLES

The following examples are provided to more clearly illustrate preferred aspects of the present invention. It is noted that several of the tests are also identified as being outside the scope of the invention, and these are provided for comparison purposes only.

In the following examples, all parts are parts by weight, all percents (%) are in percent by weight, (except percent relative humidity) and all temperatures are expressed in degrees farenheit. Moisture tests are made in these examples using an Ohaus moisture balance.

EXAMPLE 1

Five batches of dough are prepared using the following formula:

| Ingredient | Amount |
| --- | --- |
| Soft Wheat Flour | 47.00 |
| Plastic Shortening (e.g. Durkee "Cakemix 96" TM | 11.34 |
| Sugar | 1.26 |
| Salt | 1.26 |
| Soda (Sodium Bicarbonate) | 1.07 |
| Sodium Aluminum Phosphate | 1.07 |
| Fresh Buttermilk | 37.00 |
| | 100% |

Each respective batch is rolled to a thickness of 11/16" and cut into cylinders of 3" diameter, placed on a pan lightly touching adjacent biscuits and are then baked at 340° F. for 15 minutes in a hot convection oven.

In Test 1, no tempering step is employed. In other tests, the freshly baked products are placed in a tempering chamber at 145° F. and 80% relative humidity, for the times indicated in Table I.

All of the products of this test, including the untempered biscuits of Test 1, and the tempered biscuits of Tests 2, 3, 4, and 5, are frozen to a temperature of −10° F., and stored. The resulting respective frozen products are then placed in a hot oven (325° F.) and heated until the interiors reach about 165° F. They are then served and consumer tested while hot. A summary of the results are set forth in Table I.

TABLE I

| Test No. | Temper. Time | % Moisture In Upper Crust | % Moisture In Center | Rating |
| --- | --- | --- | --- | --- |
| 1* | None | 10-12% | 35% | Unsatisfactory |

TABLE I-continued

| Test No. | Temper. Time | % Moisture In Upper Crust | % Moisture In Center | Rating |
| --- | --- | --- | --- | --- |
| 2* | 9 | 15% | 35% | Unsatisfactory |
| 3 | 10 | 16% | 35% | Satisfactory |
| 4 | 20 | 20% | 35% | Excellent |
| 5 | 30 | 22% | 35% | Excellent |

*Tests 1 and 2 are not in accordance with this invention.
Tests 3, 4, and 5 are exemplary of the invention.
The rating column in Table I, refers to a subjective organoleptic comparison in which the standard of comparison is a freshly baked biscuit which has never been frozen.

The product of Tests 1 and 2 gave dry, crumbly, hard, over-baked appearance at the upper crust on the surface when the frozen product was placed directly in an oven and "baked" at 325° F. for 15 minutes (internal temperature reached 170° F.). Products of Tests 2, 3, and 4, however on baking at the same time-temperature conditions, gave consumers ready hot biscuits that compared as equal to freshly baked biscuits. Generally speaking, I have found that the higher the upper crust moisture after the tempering step, the better, after the tempering step, although moisture levels above 35% on the surface provide no additional advantage.

EXAMPLE 2

Biscuits are prepared and initially baked in accordance with Example 1 above. Instead of then being placed in a tempering oven, however, they were sprayed lightly with an atomizer to bring the moisture level of the upper crust up to about 25%. They were then frozen and wrapped and stored in a freezer.

Upon removal from the wrapping, after the frozen biscuit is placed into a hot oven, and after being baked in the 325° oven for 15 minutes the product when served hot, rates as highly as freshly baked biscuits.

DISCUSSION

Numerous modifications in the above procedure can be employed. For example, the pre-baked biscuit preform may be oiled at the top surface by spraying or brushing with butter or butter flavored oil so that the final baked product has a soft oily texture. Similarly, oil may be added to the surface after the final bake to produce a similar biscuit.

Consumer acceptance tests on biscuits prepared in accordance with the above invention have shown that the acceptability of the biscuits is equal to the acceptance of fresh baked biscuits prepared from the same formula.

The step in the method of this invention which I believe is particularly critical, in combination with the other steps, is the tempering step. While I do not wish to be bound by any particular theories, it is my belief based on repeated observation, that the tempering step which increases the moisture levels in the immediate region of the top surface of the biscuits provided unexpected beneficial results. It is not fully understood whether this increase in moisture in the surface regions of the biscuit plays an important role in establishing desirable characteristics during the freezing step, in the final baking steps, in some other manner, or as a result of a combination of factors. When the biscuits which are produced in the method of this invention are taken from the freezer and placed in a hot oven, the resulting heated, ready for the consumer product, does not have an excessively dry crust nor a moist gummy center, the latter characteristics being typical in frozen biscuits prepared where the tempering step has been omitted.

If the biscuit is not fully baked before freezing it will collapse upon further processing. In this invention the biscuit is fully baked before tempering or freezing, so that the form is fixed. Based on my experience, I would expect that if complete baking is not employed, prior to freezing, the biscuit would collapse in the final baking step and it will not rise again in the final baking step, resulting in a dense, most undesirable product.

In addition, in processes not in accordance with the present invention, and in which the tempering step is not utilized, simply taking the biscuits from the freezer, results in a final "over baking" and excessive browning of the crust in the final "baking" step, in which sufficient time-temperature is employed to heat the interiors to the temperature of freshly baked biscuits e.g. to 165° F. or above. Also excessive dryness and crumbly crispness is seen at the surface in such products not in accordance with this invention.

What is claimed is:

1. The process for producing a consumer-ready pre-baked chemically leavened frozen biscuit comprising the steps:
   a. preparing a biscuit dough, and shaping the dough into a raw biscuit preform,
   b. baking the preform to bake out the interior to a temperature of at least 165° F. resulting in a freshly baked biscuit, having a substantially horizontal upper crust,
   c. tempering the freshly baked biscuit by adding moisture to the upper crust of the freshly baked biscuit in an amount sufficient to raise the moisture content of the upper crust to at least 16%, to produce a tempered baked biscuit,
   d. freezing the resulting tempered baked biscuit resulting in a frozen biscuit,
   e. baking the frozen biscuit by placing the frozen biscuit directly into a hot oven and subjecting the frozen biscuit to time-temperature baking conditions sufficient to raise the internal temperature of the biscuit to at least about 165° F. which would otherwise be a regular baking cycle, and,
   f. removing the resulting consumer ready article from the oven.

2. The method of claim 1 in which in step c., sufficient moisture is added to raise the moisture content of the upper crust to about 20% by weight or above.

3. The method of claim 1 in which in step c., sufficient moisture is added to raise the moisture of the crust to 25% by weight or above.

4. The method of claim 1 in which the resulting frozen biscuit is then placed directly into a hot oven, and without an intermediate defrost treatment is baked, until the core temperature reaches at least about 165° F.

5. A process for producing a consumer-ready pre-baked chemically leavened frozen biscuit comprising the steps:
   a. preparing a biscuit dough, and shaping the dough into raw biscuit preform,
   b. baking the preform to bake out the interiors to a temperature of at least about 165° F., resulting in a freshly baked biscuit,
   c. tempering the hot freshly baked biscuit by adding moisture to the upper crust of the hot freshly baked biscuit in an amount sufficient to raise the moisture content of the upper crust to at least 16%, to produce a tempered baked biscuit,
   d. freezing the resulting tempered baked biscuit thereby resulting in a frozen biscuit,
   e. baking the frozen biscuit by placing the frozen biscuit directly into a hot oven and subjecting the frozen biscuit to time-temperature conditions which would otherwise be a regular baking cycle raising the temperature of the interior of the biscuit to at least about 165° F., and removing the resulting consumer ready article from the oven.

6. The method of claim 5 in which the tempering step is conducted in an environment having a temperature in the range 140° F. to 150° F. and relative humidity in the range of 70-90%.

7. The method of making a fully baked chemically leavened frozen oven ready biscuit comprising the steps:
   a. making a freshly baked biscuit which is fully baked to an internal temperature of at least about 165° F.;
   b. placing the freshly baked biscuit in an environment having a temperature of 130°-170° F. and having a relative humidity in the range of 60-95% for a period of time 15-20 minutes;
   c. freezing the resulting tempered biscuit; and without an intervening defrost step subjecting the resulting frozen product to baking conditions for sufficient time and temperature to heat the interior of the biscuit to at least about 165° F.

8. The method of claim 7 in which the tempering step is conducted in an environment having a temperature in the range 140° F.-170° F. and relative humidity in the range of 70-90%.

* * * * *